(12) United States Patent
Warner

(10) Patent No.: US 6,681,719 B1
(45) Date of Patent: Jan. 27, 2004

(54) PET DISH

(76) Inventor: James E. Warner, 825 Gunnison Rd., York, PA (US) 17404

( * ) Notice: Subject to any disclaimer, the term of this patent is extended or adjusted under 35 U.S.C. 154(b) by 0 days.

(21) Appl. No.: 10/305,160

(22) Filed: Nov. 27, 2002

(51) Int. Cl.[7] .......................... A01K 1/10; A01K 39/00; A01K 5/00
(52) U.S. Cl. ...................................... 119/61; 119/51.01
(58) Field of Search ................................ 119/61, 51.01, 119/52.1, 51.5; D30/130

(56) References Cited

U.S. PATENT DOCUMENTS

D105,450 S * 7/1937 Clifton ...................... D30/130
2,584,301 A * 2/1952 Sinclair ........................ 119/61
5,144,912 A * 9/1992 Hammett et al. ............. 119/61
5,501,176 A    3/1996 Tully
5,887,545 A    3/1999 Cuttress
6,311,640 B1  11/2001 Mercado

* cited by examiner

Primary Examiner—Charles T. Jordan
Assistant Examiner—Judith A. Nelson

(57) ABSTRACT

A pet dish for holding pet food or water includes a dish portion having a top wall and a peripheral side wall that is attached to a peripheral edge of the top wall and extends downward therefrom. The top wall has at least one depression therein and defines a food receptacle. The at least one depression is centrally disposed in the top wall such that a margin of the top wall is formed extending around the depression. A handle is attached to the margin and extends upwardly therefrom.

2 Claims, 3 Drawing Sheets

PET DISH

BACKGROUND OF THE INVENTION

1. Field of the Invention

The present invention relates to pet food dishes and more particularly pertains to a new pet food dish that would eliminate the need for a user to bend over to place the dish on the floor.

2. Description of the Prior Art

The use of pet food dishes is known in the prior art. U.S. Pat. No. 5,887,545 describes a pet dish that has a double bowl and a removable cylindrical handle that attaches to the rear of the bowl. However, the pet dish of this device would require the dish to be held or abutted against a steady surface in order to prevent the dish to slide across a floor surface while the handle is being attached. Another type of pet food dish is U.S. Pat. No. 6,311,640 describes an animal food and water dish having a retractable handle positioned in the center of the dish which would still require a user to bend down and to grasp the retracted handle. U.S. Pat. No. 5,501,176 describes a pet feeding apparatus While these devices fulfill their respective, particular objectives and requirements, the need remains for a device that includes a handle that is easy to attach.

SUMMARY OF THE INVENTION

The present invention meets the needs presented above by utilizing a handle that can be attached easily to the dish portion without moving the dish portion about a support surface.

Another object of the present invention is to provide a new pet food dish that would allow the user to place and retrieve the dish without bending over.

Still another object of the present invention is to provide a new pet food dish that would include a handle that could be easily attached and removed with one hand.

To this end, the present invention generally comprises a dish portion including a top wall and a peripheral side wall that is attached to a peripheral edge of the top wall and extends downward therefrom. The top wall has at least one depression therein and defines a food receptacle. The at least one depression is centrally disposed in the top wall such that a margin of the top wall is formed extending around the depression. A handle is attached to the margin and extends upwardly therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
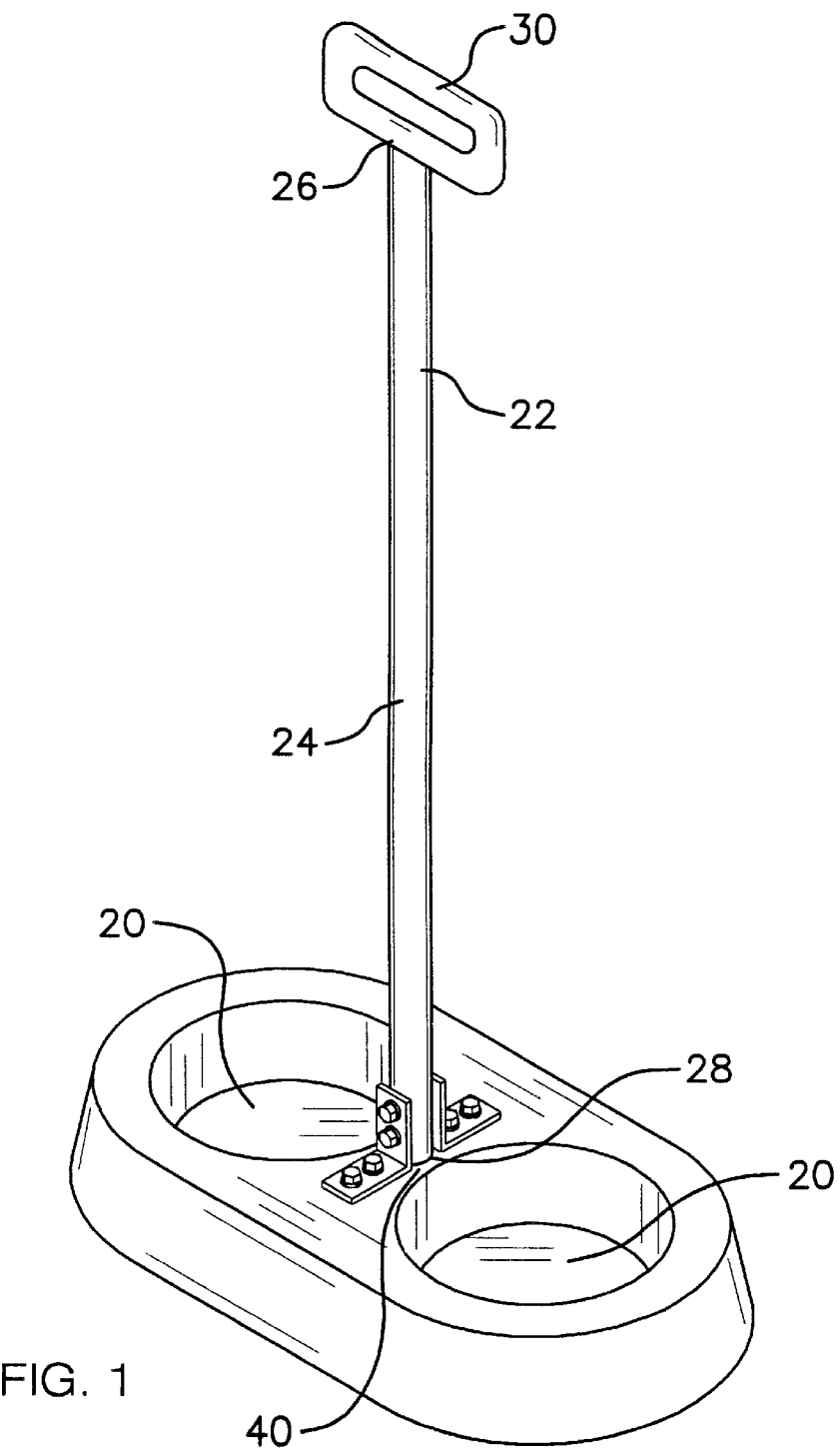
FIG. 1 is a perspective view of a pet dish according to the present invention.
Figure 2:
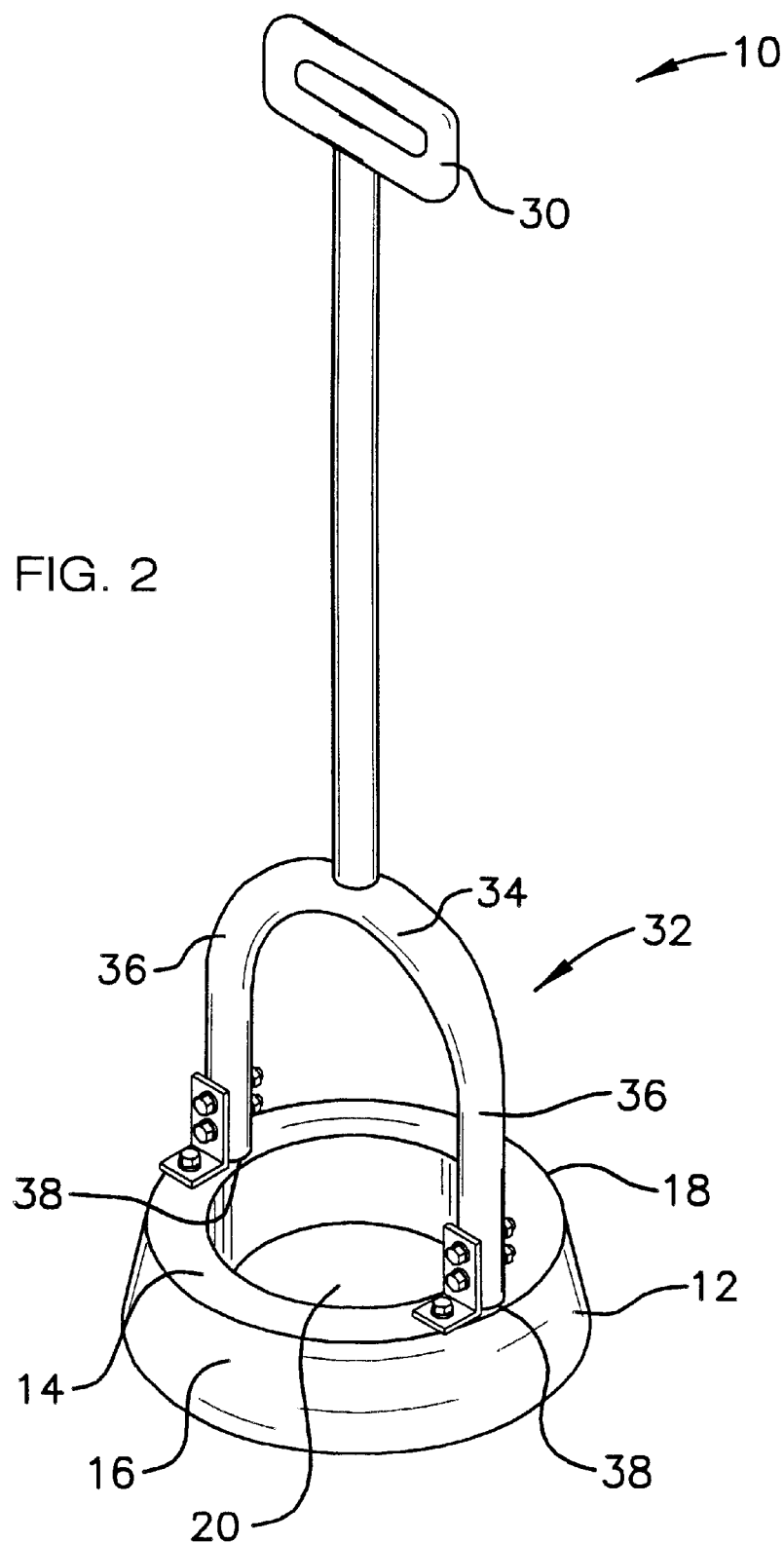
FIG. 2 is a perspective view of the present invention.
Figure 3:
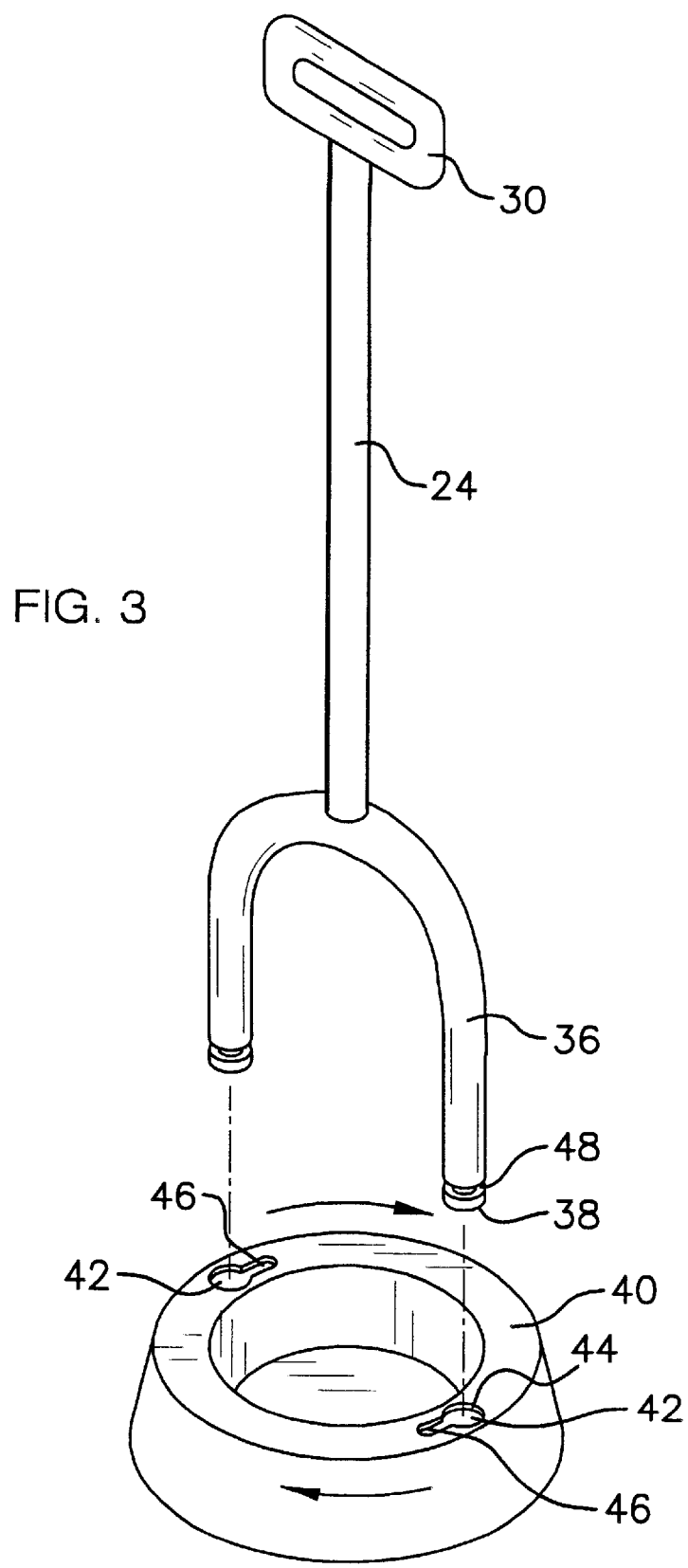
FIG. 3 is a perspective view of the present invention.

With reference now to the drawings, and in particular to FIGS. 1 through 3 thereof, a new pet food dish embodying the principles and concepts of the present invention and generally designated by the reference numeral 10 will be described.

As best illustrated in FIGS. 1 through 3, the pet dish 10 as shown in FIG. 2 generally comprises a dish portion 12 including a top wall 14 and a peripheral side wall 16 that is attached to a peripheral edge 18 of the top wall 14 and extends downward therefrom. The top wall 14 has at least one depression 20 therein and defines a food receptacle for receiving pet food. The at least one depression 20 is centrally disposed in the top wall 14 such that a margin of the top wall 14 is formed extending around the depression 20. Alternatively, a second embodiment is shown in FIG. 1 that includes a pair of depressions 20 wherein a portion of the margin is positioned between the pair of depressions 20.

A handle 22 is attached to the dish portion 12 and extends upwardly therefrom. The handle 22 includes an elongated rod 24 having an upper end 26 and a lower end 28. A loop 30 is attached to the upper end 26 for receiving fingers. In the first embodiment, a bracket 32 has a central portion 34 and a pair of arms 36 such that the bracket 32 generally has a U-shape. Each of the arms 36 has a free end 38 attached to the margin such that the arms 36 extend upwardly from the top wall 14 and the central portion 34 traverses the depression 20. In the second embodiment, the lower end 28 of the elongated rod 24 is attached to the margin 40 between the pair of depressions 20.

In a third embodiment, depicted in FIG. 3, the margin 40 has a pair of openings 42 extending therethrough. Each of the openings 42 has an edge 44 having a notch 46 therein. Each of the arms 36 of the bracket 32 has a peripheral slot 48 therein positioned near the free ends 38. The free ends 38 may be positioned in the openings 42 such that the slots 48 are aligned with the notches 46 and the arms 36 slidably positioned into the notches 46. In this manner, the arms 36 are releasably attached to the top wall 14.

In use, the device is used as a conventional dish for the holding of foot or water. However, when food or water is needed, or the dish portion 12 needs to be cleaned, the user may use the handle 22 to lift the dish portion 12 of off the floor.

With respect to the above description then, it is to be realized that the optimum dimensional relationships for the parts of the invention, to include variations in size, materials, shape, form, function and manner of operation, assembly and use, are deemed readily apparent and obvious to on e skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food dish and handle combination device comprising:

a dish portion comprising a top wall and a peripheral side wall being attached to a peripheral edge of said top wall and extending downward therefrom, said top wall having at least one depression therein and defining a food receptacle, said at least one depression being centrally disposed in said top wall such that a margin of said top wall is formed extending around said depression;

a handle being attached to said dish portion and extending upwardly therefrom, said handle including;

an elongated rod having an upper end and a lower end;

a loop being attached to said upper for receiving fingers; and a bracket having a central portion and a pair of arms such that said bracket generally has a U-shape, each of said arms having a free end attached to said margin such that said arms extend upwardly from said top wall and said central portion traverses said depression.

2. A food dish and handle combination device comprising:

a dish portion comprising a top wall and a peripheral side wall being attached to a peripheral edge of said top wall and extending downward therefrom, said top wall having at least one depression therein and defining a food receptacle, said at least one depression being centrally disposed in said top wall such that a margin of said top wall is formed extending around said depression, said margin having a pair of openings extending therethrough, each of said openings having an edge having a notch therein;

a handle being removably attached to said dish portion such that said handle extends upwardly therefrom, said handle including;

an elongated rod having an upper end and a lower end;

a loop being attached to said upper for receiving fingers; and a bracket having a central portion and a pair of arms such that said bracket generally has a U-shape, each of said arms having a free end, each of said arms having a peripheral slot therein positioned near said free ends, wherein said free ends may be positioned in said openings such that said slots are aligned with said notches such that said arms are releasably attached to said top wall.

\* \* \* \* \*